United States Patent Office 3,454,855
Patented July 8, 1969

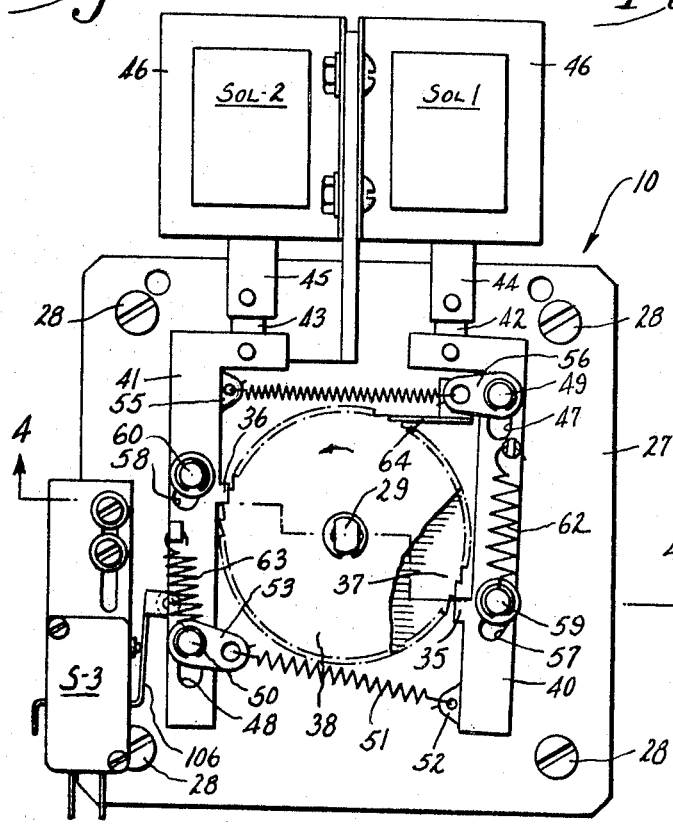
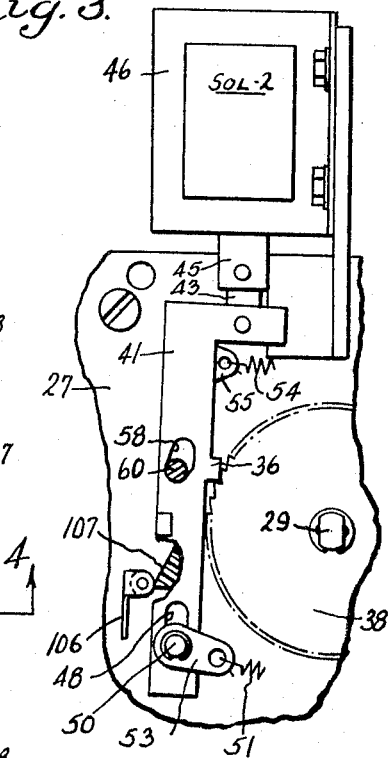
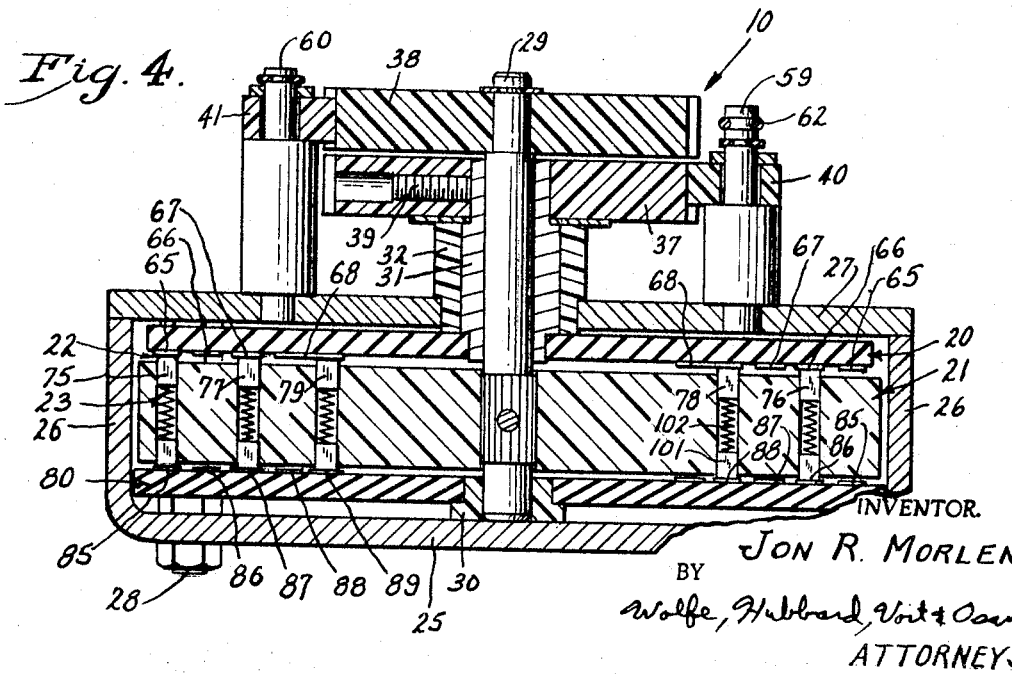

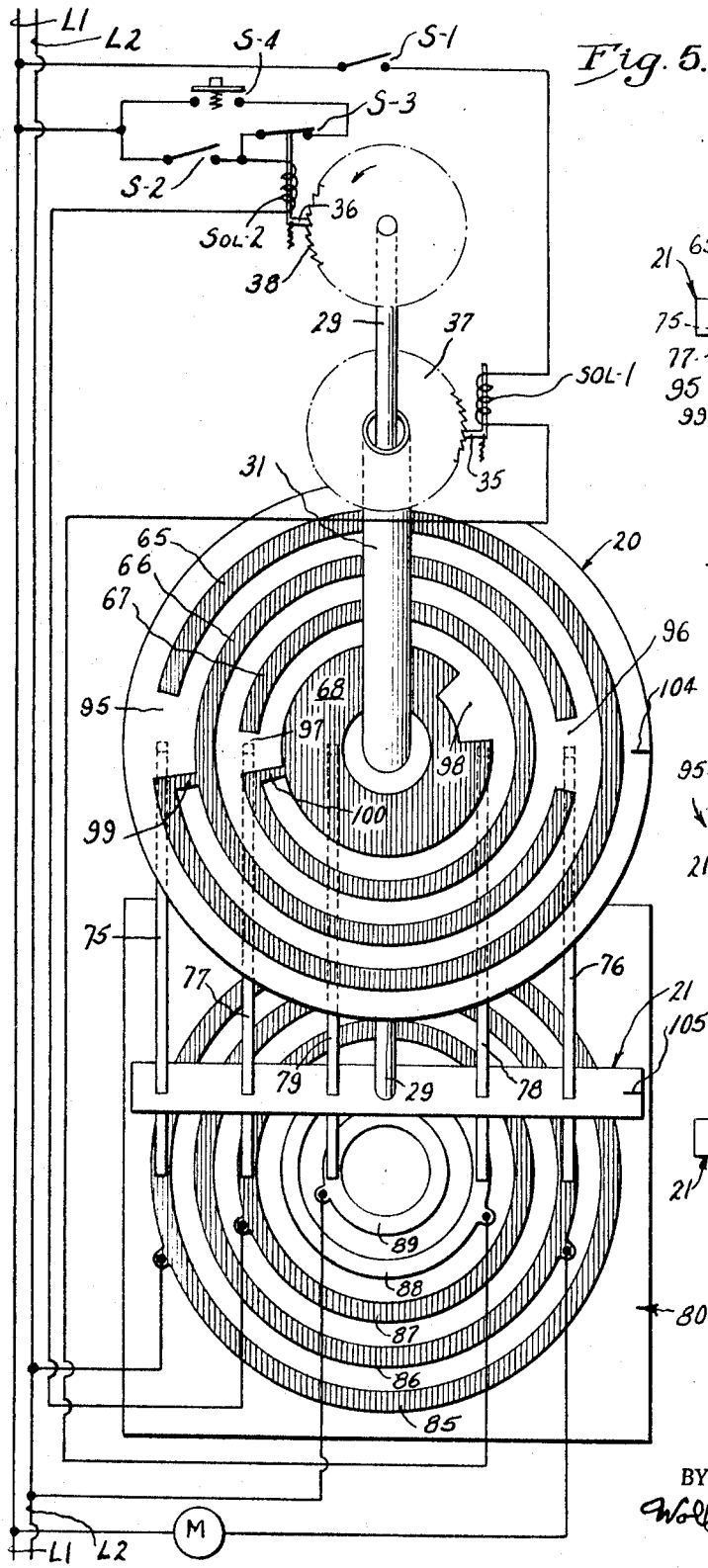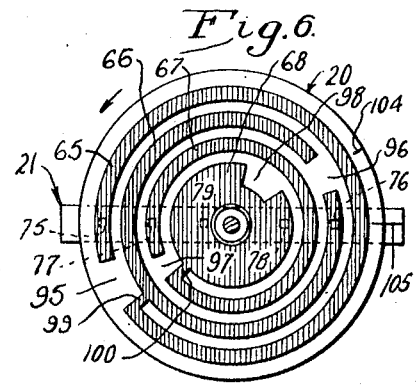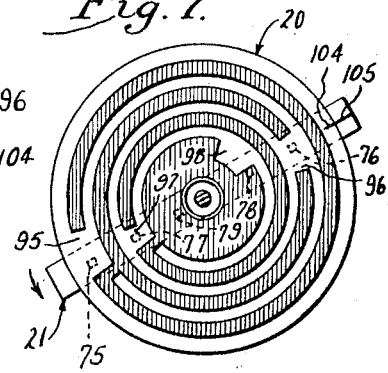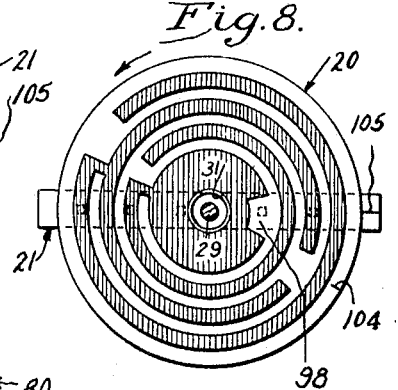

3,454,855
**STEPPING SERVO IN WHICH A FIRST TRANS-
MITTER IS ADVANCED AND A SECOND FEED-
BACK TRANSMITTER FOLLOWS**
Jon H. Morlen, Rockford, Ill., assignor to Barber-Colman
Company, Rockford, Ill., a corporation of Illinois
Filed Aug. 19, 1966, Ser. No. 573,634
Int. Cl. G05b 1/08, 6/02, 11/06
U.S. Cl. 318—31                                    18 Claims

ABSTRACT OF THE DISCLOSURE

A responder type control mechanism includes a pair of face-to-face rotors carrying circuit forming elements and operable to place an electrical circuit in a normal condition when the angular positions of the rotors agree and in an off-normal condition when the angular positions of the rotors disagree. One of the rotors is advanced step-by-step in response to a train of input signals while the other rotor is advanced step-by-step in response to a train of feedback signals, the advanceent of the second rotor continuing until the feedback intelligence agrees with the input intelligence.

---

This invention relates in general to responder type control devices which function upon the receipt of time-sequenced input signals or pulses to cause a utilization device to operate until its response, represented by feedback signals or pulses, agrees with the input intelligence. More particularly, the invention pertains to a control mechanism for placing an electrical circuit in an off-normal condition in response to a first or input train of signals and for restoring the circuit to a normal condition in response to a second or feedback train of signals. While not so limited in its application, the invention finds especially advantageous use in so-called credit-dispense systems of the prepayment type in which the input train of signals is produced as an incident to the depositing of coins to purchase a given quantity of material and the feedback train of signals is produced as an incident to the dispensing of the material. The control mechanism first operates in response to the input train of signals to condition an electric circuit for the material dispensing device thus energizing the latter, and then operates in response to the feedback train of signals to change the condition of the circuit and to de-energize the dispensing device automatically when the exact quantity of material purchased has been dispensed.

The general object of the present invention is to provide a new and improved control mechanism of the above type for holding the circuit in one condition until the number of signals in the feedback train attains a predetermined relationship with the number of signals in the input train, the mechanism being characterized not only by its ability to respond to both trains of signals simultaneously but also by its simplicity in organization and compactness in construction as compared with prior controls used for related purposes.

A more detailed object is to achieve the foregoing with a relatively compact pair of unidirectional coaxial rotors disposed in face-to-face relation and carrying circuit forming elements initially matched to place the circuit in a normal condition, one of the rotors being advanced in response to the input train of signals so that the elements become mismatched to place the circuit in an off-normal condition, and the other rotor being advanced in response to the feedback train of signals until the elements again are matched to restore the circuit to its normal condition.

A further object is to do away with the need for resetting the control mechanism at the end of each cycle of operation.

Still another object is to utilize means acting independently of the feedback train of signals for causing a change in the condition of the circuit in the event the number of signals in the feedback train fails to attain a predetermined relationship with the number of signals in the input train.

The invention also resides in the mechanism employed for advancing the rotors and in the novel arrangement of the circuit forming elements carried by the rotors.

Other objects and advantages will become apparent from the following detailed description of a preferred and exemplary embodiment taken in connection with the accompanying drawings, in which:

FIG. 2 is a plan view of the control mechanism with certain parts broken away for purposes of clarity;

FIG. 3 is a fragmentary plan view of the control mechanism shown in FIG. 2 with certain parts broken away and shown in moved positions;

FIG. 4 is an enlarged fragmentary cross-section taken substantially along the line 4—4 of FIG. 2;

FIG. 5 is a schematic illustration and circuit diagram of the control mechanism showing the position of the rotors when the circuit forming rotatable elements are matched in position;

FIG. 6 is a plan view of the rotors after one has advanced and the circuit forming elements are mismatched in position;

FIG. 7 is a view similar to FIG. 6 after the other rotor has advanced and the circuit forming elements again are matched in position;

FIG. 8 is a plan view of the rotors after one of the rotors has advanced almost 360 degrees ahead of the other rotor.

Figure 1:
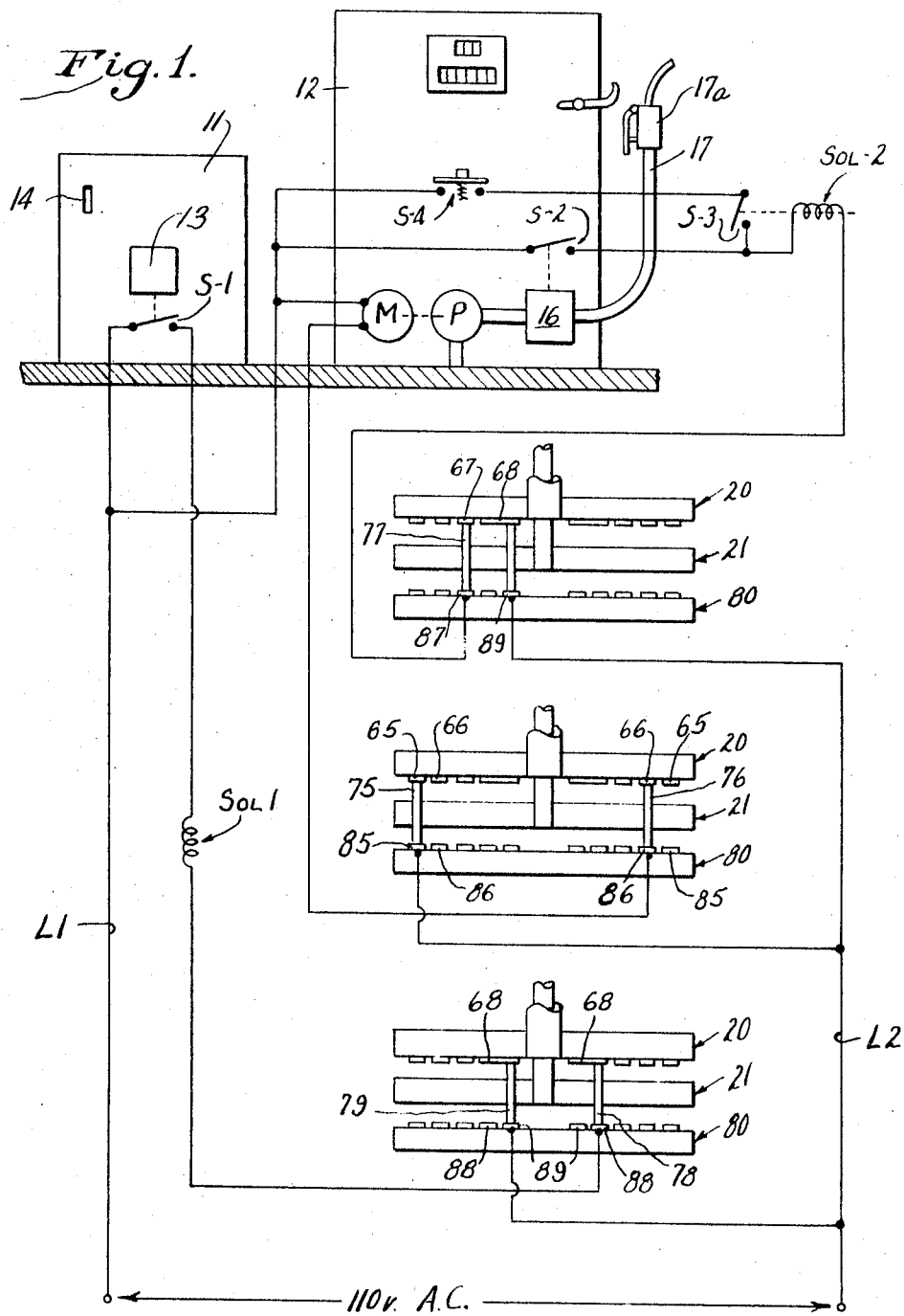
FIGURE 1 is a schematic view and circuit diagram showing the control mechanism incorporated in a coin-operated gasoline dispensing system.

While the invention has been shown and will be described in some detail with reference to a particular embodiment in a specific environment, there is no intention that it thus be limited to such detail. On the contrary, it is intended here to cover all modifications, alternatives and equivalents falling within the spirit and scope of the invention as defined by the appended claims.

As shown in the drawings, the invention is embodied in a control mechanism 10 (FIG. 2) for conditioning an electrical circuit in response to a first or input train of signals and for changing the condition of the circuit in response to a second or feedback train of signals. While the control mechanism will find application in various and different environments, it will be here disclosed in conjunction with a prepayment type credit and dispense system and, more particularly, in connection with a coin-operated, self-service gasoline dispensing system in which the input train of signals is produced as a customer deposits coins in a coin box 11 (FIG. 1), and in which the feedback train of signals is produced as gasoline is dispensed from a gasoline pump 12. The control mechanism registers a predetermined amount of credit in response to each signal of the input train and closes a circuit to energize the pump motor M, and then responds to the feedback train of signals to shut off the pump motor and terminate the flow of gasoline when the number of gallons dispensed corresponds in value to the worth of the coins deposited.

In this instance, the coin box 11 includes a conventional actuator 13 (FIG. 1) which momentarily closes a normally open switch S–1 a predetermined number of times to produce the input signals each time a coin is deposited in a receiving slot 14 of the coin box 11. For example, the actuator may pulse the switch one time for each quarter deposited and two times for each half dollar deposited. The control mechanism 10 is, in one sense, a switch serially connected with the pump motor M and a voltage source here represented by power leads L–1 and L–2. The motor is mechanically coupled to drive a rotary pump P.

As coins are deposited to pulse the switch S–1 and produce the input signals, the control mechanism 10 closes the circuit for the pump motor M so that the pump P feeds gasoline from an underground storage tank (not shown) through a meter 16 and a delivery hose 17. Of course, the flow of gasoline occurs only when a customer or attendant opens a hand valve 17a associated with the hose nozzle. Each time a predetermined quantity of gasoline passes through the meter, the latter actuates a cam (not shown) in a well known manner to pulse a normally open switch S–2, thus producing a feedback signal. For purposes of discussion, it may be assumed that the meter pulses the switch S–2 one time for each quarter's worth of gasoline dispensed. Accordingly, an input signal is produced for every quarter deposited and a feedback signal is produced when a quantity of gasoline having a corresponding value is delivered.

In its primary aspect, the present invention contemplates an extremely simple and compact control mechanism 10 for holding a circuit in one condition until the ratio of the number of signals in the input train to the number of signals in the feedback train reaches a predetermined value, the mechanism being capable of responding to both types of signals simultaneously, as when additional coins are deposited at the same time gasoline is being dispensed. For this purpose, the control mechanism comprises a pair of compact coaxial rotors 20 and 21 carrying circuit forming elements 22 and 23 which, when matched in their angular positions, open the circuit for the pump motor M. As coins are deposited thus producing the input train of signals, the rotor 20, herein referred to as the credit rotor, is intermittently advanced through a number of steps correlated with the number of signals produced, and the circuit forming elements 22 and 23 become mismatched to close the circuit for the pump motor. Then, as gasoline is dispensed thus producing the feedback train of signals, the rotor 21, which may be called the dispense rotor, is indexed in the same direction as the credit rotor 20 until the circuit forming elements are again brought into matched relationship. Upon this occurrence, the circuit is automatically reopened to shut off the pump motor and stop the flow of gasoline, the number of gallons dispensed having equalled the number of gallons purchased, and the ratio of the number of signals in the two trains having reached a predetermined value. Since the rotors are indexed in the same direction, the condition of the circuit is dependent only upon the relative positions of the rotors and not upon their positions with respect to a fixed starting point. As a result, the mechanism may respond to both trains of signals simultaneously and does not have to be reset at the end of each cycle of operation.

In the present instance, the rotors 20 and 21 are mounted for rotation in an enclosed housing formed by a base plate 25 (FIG. 4), upstanding integral side walls 26 and a flat cover plate 27, the latter being fastened to the base plate by bolts 28. The dispense rotor 21 is fast on an upright shaft 29 which has its lower end journaled in a bushing 30 on the base plate and which projects upwardly through the cover plate. Telescoped coaxially over and rotatable on the projecting portion of the shaft is a cylindrical sleeve 31 journaled in a bushing 32 in the cover plate and carrying the credit rotor 20 at its lower end. The upper surface of the credit rotor is disposed closely adjacent the underside of the cover plate 27, while the lower surface of the credit rotor is disposed in face-to-face relation with the upper surface of the dispense rotor 21.

Indexing of the rotors 20 and 21 is achieved by credit and dispense solenoids SOL–1 and SOL–2 acting through pawls 35 and 36 (FIG. 2) upon ratchet wheels 37 and 38 fast on the sleeve 31 and the shaft 29, respectively. The ratchet wheels 37 and 38 are identical in construction, the former being fastened to the upper end of the sleeve by a set screw 39 and the latter being similarly fastened to the upper end of the shaft. Because the two ratchet wheels are respectively connected to drive the coaxially disposed sleeve 31 and shaft 29, they may be compactly nested with only slight axial clearance between them. The pawls 35 and 36 are simply lugs engageable with the teeth of the respective ratchet wheels and formed integrally on L-shaped levers 40 and 41 pivotally connected by links 42 and 43 to the reciprocating armatures 44 and 45 of the solenoids, the latter being supported in side-by-side relation on brackets 46 fastened to the cover plate 27. As shown most clearly in FIGS. 2 and 4, the levers are disposed at different levels on opposite sides of the ratchet wheels and are formed with substantially straight elongated slots 47 and 48 which loosely receive upstanding guide posts 49 and 50 fastened to the cover plate 27. A tension spring 51 stretched between an ear 52 integral with the lever 40 and a link 53 on the post 50 urges the pawl 35 into engagement with the teeth of the ratchet wheel 37, while a similar spring 54 stretched between an ear 55 integral with the lever 41 and a link 56 on the post 49 urges the pawl 36 into engagement with the teeth of the ratchet wheel 38. As the armatures of the solenoids reciprocate, the pawls alternately engage and disengage the teeth of the respective ratchet wheels to index the rotors 20 and 21 in a counterclockwise direction. To promote the ratcheting action of the pawls, the levers are formed with cam slots 57 and 58 which engage posts 59 and 60 upstanding from the cover plate 27 and cooperate with the springs 51 and 54 to rotate the levers through a short arc about the links 42 and 43 as the armatures reciprocate.

Because of the disposition of the levers 40 and 41 and the ratchet wheels 37 and 38, the pawl 35 engages the ratchet wheel 37 to index the credit rotor 20 on the inward stroke of the armature 44 in response to energization of the credit of solenoid SOL–1, and then disengages the wheel as the solenoid is de-energized and the lever 40 and armature 44 are returned by the action of a biasing spring 62 stretched between the post 59 and a lug formed on the upper surface of the lever. In contrast, a tension spring 63 stretched between the post 50 and a lug on the lever 41 urges this lever away from the dispense solenoid SOL–2 as the latter is de-energized so that the pawl 36 engages the ratchet wheel 38 to index the dispense rotor 21. The pawl 36 then releases the ratchet wheel 38 on the energize stroke of the dispense solenoid. Both ratchet wheels and the rotors 20, 21 coupled to them thus step counterclockwise (as viewed in FIG. 2) in response to each energization of their corresponding solenoid. To prevent the rotors from rotating reversely or in a clockwise direction, a single locking pawl in the form of a spring arm 64 (FIG. 2) fastened to the cover plate 27 is biased into yielding engagement with the teeth of both ratchet wheels. Due to the coaxial disposition of the ratchet wheels and the rotors and the side-by-side arrangement of the solenoids, the control mechanism is formed as a very compact unit and thus is especially suitable for use in installations in which the availability of space is limited.

Herein, the circuit forming elements 22 comprise a series of conductor strips 65 to 68 on the credit rotor 20, and the circuit forming elements 23 comprise a series of brushes 75 to 79 carried by the dispense rotor 21. Disposed immediately below the dispense rotor and fastened to the bushing 30 is a stationary circuit board 80 equipped with five circular conductor bands 85 to 89 which coact with the brushes and the strips to selectively establish circuits for the pump motor M and the solenoids SOL-1, SOL-2 in accordance with the relative angular positions of the two rotors. These circuits are shown in FIGS. 1 and 5, with the control mechanism 10 being illustrated schematically in FIG. 1 as having three portions to show the relationship of the board 80 and the rotors 20 and 21 in each of the three circuits.

Preferably, the credit rotor 20 is circular and the circuit board 80 is square in shape and both are formed of suitable non-conductive material such as a fiber or plastic similar to that used for "printed circuits." The conductor strips 65 to 68 and the bands 85 to 89 are formed of copper or the like bonded to the insulating base. Indeed, the board 80 and the rotor 20 may be manufactured by the convenient plating and etching technique commonly used in the production of printed boards for electronic circuits. As shown in FIG. 5, the circular bands 85 to 89 are completely continuous and unbroken and are spaced apart radially on the board so as to be concentric with each other and with the axis of the rotors 20 and 21. With this arrangement, each band is electrically separated from each of the other bands by the non-conductive material of the board and thus defines a separate path for the flow of current.

The conductor strips 65 and 67 are spaced radially from each other on the credit rotor 20 in accordance with the spacing of the conductor bands 85 to 87 on the board 80, and thus each of these strips is vertically alined with the correspondingly spaced band. The inner conductor strip 68 has a greater radial width than the other strips and overlies the two innermost bands 88 and 89. While the conductor strips are concentrically curved about the axis of the rotors 20 and 21, they are not completely circular in that their ends are separated by the insulating material of the credit rotor 20. Thus, an insulator segment 95 (FIG. 5) separates the ends of the strip 65, an insulator segment 96 separates the ends of strip 66, and an insulator segment 97 separates the ends of strip 67. The wide inner conductor strip 68 is continuous in that its ends are not completely separated, but this strip is partially interrupted by an insulator segment 98 defined by a notch formed in the outer periphery of the strip. For purposes which will be apparent hereafter, the strips 65 and 66 are connected by a conductive bridge 99, and the strips 67 and 68 are connected by a conductive bridge 100.

Each of the brushes 75 to 79 comprises a pair of small carbon blocks 101 (FIG. 4) received in a vertical hole in the bar-shaped dispense rotor 21 and urged away from opposite faces of the rotor by a conductive compression spring 102 disposed in the hole between the cylinders. The brushes 75 to 77 are radially spaced from the axis of the rotors 20 and 21 in accordance with the spacing of the strips 65 to 67 and the bands 85 to 87 so that each of these brushes is vertically alined with the correspondingly spaced strip and band and has its opposite ends biased into engagement with the strip and band. The lower ends of the brushes 78 and 79 are alined with and contact the bands 88 and 89, respectively, while the upper ends of these brushes both contact the wide conductor strip 68. Since the bands 85 to 89 are continuous, the lower end of each brush is always in contact with one of the bands on the circuit board 80 regardless of the relative positions of the rotors 20 and 21. On the other hand, the upper ends of the brushes either contact the strips 65 to 68 or the insulator segments 95 to 98, depending on the relative angular positions of the rotors, and the condition of the circuits for the pump motor M and the solenoids SOL-1 and SOL-2 changes as the upper ends of the brushes alternatively contact the strips and the insulator segments.

Initially, the rotors 20 and 21 are positioned in angular agreement, and the brushes 75 to 79 and the strips 65 to 68 are disposed in matched relationship as shown in FIG. 5. For purposes of clarity, it may be assumed that an imaginary index mark 104 (FIG. 5) on the credit rotor 20 is vertically alined with a similar index mark 105 on the dispense rotor 21 when the rotors are in angular agreement and when the brushes and strips are in matched relationship. With the rotors so positioned, brushes 75, 76 and 77 contact the insulator segments 95, 96 and 97, and brushes 78 and 79 contact the wide conductor strip 68. Accordingly, an open series circuit is created from the line L-1, through the normally open switch S-1, the credit solenoid SOL-1, band 88, brush 78, conductive strip 68, brush 79, and band 89 back to the line L-2.

Then, as coins are deposited, the credit switch S-1 is repeatedly closed and opened thereby to pulse the credit solenoid SOL-1 so that the latter indexes the credit rotor 20 counterclockwise through a number of steps equal to the number of pulses. For example, if four quarters are deposited, the credit rotor will be advanced four steps to position the index mark 104 four steps ahead of the index marks 105 as shown in FIG. 6. As the credit rotor is indexed, the insulator segments 95 and 96 rotate out of contact with the brushes 75 and 76, and the conductor strips 65 and 66 rotate into contact with these brushes. As a result, an energizing current path is completed from the line L-1 through the pump motor M, strip 86, brush 76, strip 66, bridge 99, strip 65, brush 75, band 85 and thus back to the line L-2. In addition, indexing of the credit rotor 20 relative to the dispense rotor 21 causes the insulator segment 97 to rotate out of contact with the brush 77 and causes the conductor strip 67 to rotate into contact with the brush 77 thereby to form a circuit for the dispense solenoid SOL-2. This circuit extends from the line L-1, through the normally open switch S-2, the solenoid SOL-2, the band 87, the brush 77, and into the strip 67. From this strip, the circuit continues across the bridge 100 into the wide strip 68, through the brush 79, the band 89, and back to the line L-2.

Since the pump motor M is now energized by the circuit through the control mechanism 10, the pump P feeds gasoline into the delivery hose 17. As the gasoline is dispensed, the dispense switch S-2 repeatedly closes and opens to pulse the dispense solenoid SOL-2 which causes the dispense rotor 21 to advance step-by-step in the same direction as the credit rotor 20. When a dollar's worth of gasoline has been delivered, the switch S-2 has been closed four times and thus the dispense rotor 21 has been indexed through four steps so that the index marks 104 and 105 are again vertically alined as shown in FIG. 7. Accordingly, the brushes 75, 76 and 77 again contact the insulator segments 95, 96 and 97, respectively, to break the circuits for the pump motor and for the dispense solenoid SOL-2. As a result, the motor is shut off and the flow of gasoline through the delivery hose is terminated automatically when the customer has received the exact quantity of gasoline purchased.

Because the rotors 20 and 21 are both indexed in the same direction and since they are always in angular agreement at the end of a dispensing cycle, a new cycle can be started with the rotors disposed in the same positions they occupied at the end of the previous cycle. The control mechanism 10 thus is automatically conditioned for a new cycle without having to drive the rotors either forwardly or reversely to a fixed starting point. In addition, the unidirectional motion of the rotors enables the depositing of additional coins by the customer at the same time gasoline is being dispensed. If the customer should, for example, deposit three additional quarters while gasoline is being delivered from the hose 17 and the dispense rotor 21 is being indexed, the credit rotor 20 merely moves three more steps ahead of the dispense rotor 21 to maintain the motor M energized and to prolong the dispensing cycle until an additional seventy-five cents worth of gasoline has been delivered. Such an arrangement is advantageous since it not only allows a customer to deposit coins whenever desired but it also does away with the need of interlocks in the coin box 11 for preventing the acceptance of additional coins once a dispensing cycle has begun.

If the customer happens initially to deposit such a large number of coins as to advance the credit rotor 20 nearly a full revolution ahead of the dispense rotor 21, the insulator segment 98 in the wide strip 68 will rotate into contact with the brush 78 as shown in FIG. 8. As a consequence, the circuit for the credit solenoid SOL–1 will be broken, and any additional coins deposited will not be effective to advance the credit rotor further until the dispense rotor is advanced to rotate the brush 78 into contact once again with the wide strip 68. The provision of the insulator segment 98 prevents the credit rotor from advancing a complete revolution ahead of the dispense rotor, and thus assures that the credit rotor will not overrun the dispense rotor and cancel the purchased credit.

In certain instances, the feedback train of signals from the switch S–2 may terminate before the dispense rotor 21 has been advanced into angular agreement with the credit rotor 20, as for example, if the gasoline tank of the customer's automobile should become filled before the entire quantity of gasoline purchased has been dispensed. Thus, if the customer, after depositing three dollars in coins, should cut off the flow of gasoline through the hose 17 upon finding that only two dollar's worth of gasoline is required, the dispense rotor would have advanced only eight steps and still would be four steps behind the credit rotor. The control mechanism 10 then would not be in condition for a new cycle, the pump motor M would not be shut off automatically, and the customer would still have a dollar of credit remaining.

Accordingly, the present invention further contemplates novel auxiliary means for causing the dispense rotor 21 to advance into angular agreement with the credit rotor 20 independently of the signals produced by the dispense switch S–2 therefore to insure that the rotors will be properly positioned to shut off the pump motor M and to begin another cycle, and also to insure that any unused credit remaining from a prematurely terminated cycle will be erased. Herein, the auxiliary means comprise an interrupter switch S–3 (FIG. 2) fastened to the cover plate 27 and having an actuator arm 106 underlying the lever 41. Carried on the underside of the lever is a cam element 107 (FIG. 3) which engages the switch arm to open and close the switch S–3 each time the link reciprocates through one cycle. The disposition of the cam and the actuator arm is such that the interrupter switch S–3 is opened as the armature 45 of the dispense solenoid SOL–2 reaches the end of its energize stroke and is closed as the armature reaches the end of its release stroke.

Let it be assumed that coins having a total value of a dollar have been deposited so that the credit rotor 20 has been advanced four steps, and that the customer returns the hose 17 to the pump rack 12 after only fifty cents worth of gasoline has been delivered so that the dispense rotor 21 has been advanced only two steps. Since no gasoline is being delivered, the dispense switch S–2 is open, the dispense solenoid SOL–2 is de-energized, and thus the interrupter switch S–3 is closed. By closing a manual push button switch S–4 associated with the pump rack, the customer will complete a circuit for the dispense solenoid SOL–2 through the closed interrupter switch S–3. As shown in FIGS. 1 and 5, such circuit permits current flow from the line L–1 through switches S–4 and S–3, solenoid SOL–2, band 87, brush 77, strip 67, bridge 100, conductive strip 68, brush 79, band 89, and back to the line L–2. Accordingly, the dispense solenoid is energized and the pawl 36 disengages a tooth on the ratchet wheel 38 as the armature 45 is retracted. When the armature approaches the end of its energize stroke, the cam 107 on the link 41 opens the interrupter switch S–3 to de-energize the dispense solenoid. As a result, the armature 45 is returned by the action of the return spring 63, and the pawl 36 engages the ratchet wheel 38 to index the dispense rotor 21 through one step. The interrupter switch S–3 again is closed by the cam as the armature 45 reaches the end of its release stroke so that the circuit for the dispense solenoid is again made. Thus, the dispense solenoid is pulsed once again to index the dispense rotor through still another step and to bring the dispense rotor into angular agreement with the credit rotor 20. Upon this occurrence, the brush 77 engages the insulator segment 97 on the credit rotor to break the circuit for the dispense solenoid through the control mechanism 10 thereby stopping the pulsing caused by the interrupter switch S–3 (even though the customer continues to hold switch S–4 closed).

With this arrangement, the dispense rotor 21 is automatically advanced into angular agreement with the credit rotor 20 when the dispensing cycle is prematurely terminated. This automatic advancement is achieved with the same solenoid SOL–2 employed to advance the dispense rotor during a normal complete operational cycle. The interrupter switch S–3 is, of course, opened and closed by the cam 107 while gasoline is being dispensed, but such opening and closing has no effect on the dispense solenoid since the push button switch S–4 is normally open to remove the interrupter switch from the circuit of the dispense solenoid. To encourage customers to depress the push button and thus cause the rotors 20 and 21 to be advanced into angular agreement, it is contemplated that a counter (not shown) responsive to the repeated pulses applied to the dispense solenoid by the interrupter switch S–3 may be employed to actuate a change-dispensing device for returning change for the unused credit.

From the foregoing, it will be apparent that the new and improved control mechanism 10 is of extremely simple and compact construction and yet is capable of responding to two simultaneous trains of signals. Moreover, the advantageous arrangement of the rotors 20 and 21 does away with the need for resetting the mechanism at the end of each cycle and, since all wiring connections to circuits external of the control mechanism are made to the conductive bands 85 to 89 on the stationary circuit board 80, the need for slip rings asosciated with movable conductors is avoided. While the mechanism has been disclosed as restoring the circuit of the pump motor M to its normal open condition only when the number of signals in the feedback train equals the number in the input train, those skilled in the art will realize that such restoration could take place when the signals in the two trains attain any predetermined numerical ratio or otherwise correspond in intelligence.

I claim as my invention:

1. In a signal-responive control, the combination of a base, a shaft journaled on said base for rotation about a predetermined axis and carrying a first rotor disposed perpendicular to said axis, a sleeve coaxially surrounding said shaft for rotation relative to the latter and carrying a second rotor disposed in face-to-face relation with said first rotor, a pair of ratchet wheels disposed parallel to said rotors, one of said ratchet wheels being fast on said shaft and the other of said ratchet wheels being fast on said sleeve, circuit forming elements carried by said rotors and establishing an electrical circuit in a normal condition when the angular positions of said rotors agree, means coacting with one of said ratchet wheels and responsive to a first train of signals for indexing one of said rotors step-by-step through a number of steps correlated with the number of signals in the train and to a position in which said one rotor is angularly mis-matched with respect to said other rotor and in which said circuit forming elements establish the circuit in an off-normal condition, and means coacting with the other of said ratchet wheels and responsive to a second train of signals for indexing the other of said rotors step-by-step in the same direction as said one rotor, whereby the circuit is restored to its normal condition only when the number of signals in the second train attains a predetermined relationship with the number of signals in the first train.

2. A control as defined in claim 1 in which said means for indexing said rotors comprise solenoids having armatures which reciprocate in response to the signals of the respective trains, and a pawl connected to each of said armatures and engageable with one of said ratchet wheels for indexing the associated rotor one step as an incident to the reciprocation of said armature through one cycle.

3. A control as defined in claim 2 in which said armatures are disposed in side-by-side relation with said pawls being disposed along opposite edges of said ratchet wheels, and further including a single locking pawl operable to engage each of said ratchet wheels to prevent reverse movement of said rotors.

4. A control as defined in claim 3 in which one of said rotors is stepped on the energize stroke of its associated armature and the other of said rotors is stepped on the release stroke of the associated armature.

5. In a signal responsive control, the combination of a base, a first rotor journaled on said base for rotation about a predetermined axis, a second rotor rotatable about said axis and disposed in face-to-face relation with said first rotor, circuit forming elements carried by said rotors and establishing an electrical circuit in a normal condition when the angular positions of said rotors agree, first means responsive to a first train of signals for intermittently advancing one of said rotors through a number of steps correlated with the number of signals in said first train to position said one rotor in angularly mis-matched relationship with said other rotor whereby said elements act to place the circuit in an off-normal condition, second means responsive to a second train of signals for intermittently advancing the other of said rotors, whereby the circuit is restored to its normal condition when the second train of signals corresponds in intelligence to the first train of signals and when the positions of said rotors again agree, auxiliary means for supplying time-spaced signals to said second means independently of the second train of signals, and said second means being responsive to the signals of said auxiliary means to advance said other rotor into angular agreement with said one rotor when the second train of signals terminates with the rotors disposed in mis-matched relationship.

6. A control as defined in claim 5 in which said circuit forming elements include means for disabling said auxiliary means when the angular positions of said rotors agree.

7. A control as defined in claim 5 in which said second means includes a solenoid having a coil and having a reciprocating armature operable to advance the other of said rotors, said auxiliary means being responsive to the reciprocation of said armature to alternately energize and de-energize said coil after the second train of signals has terminated.

8. A control as defined in claim 7 in which said auxiliary means comprises a switch having an actuator movable back and forth by the reciprocation of said armature whereby said switch is alternately closed and opened and said solenoid is alternately energized and de-energized.

9. A control as defined in claim 8 in which said switch is closed as said armature approaches the end of its release stroke.

10. A control as defined in claim 5 in which said circuit forming elements include means for disabling said first advancing means when the signals in said first train exceed a predetermined number before said second rotor advances.

11. In a signal-responsive control device, the combinatino of a base, a pair of circular and concentric conducting bands on said base each adapted for connection to an electrical device to be controlled, a first rotor spaced from said conducting bands and carrying an arcuate conductor strip concentric with and facing said conducting bands, insulation on said first rotor separating the ends of said conductor strip from each other, a second rotor sandwiched between said first rotor and said conducting bands and carrying a pair of conducting elements movable with said rotor in an arcuate path concentric with said strip and said bands, each of said conducting elements having one end operable to sweep across and contact said conductor strip along a portion of said path and having an opposite end operable to sweep across and contact one of said conducting bands whereby an electrical circuit for the device is completed through said strip, said elements and said bands, said one end of at least one of said elements being operable to sweep across and contact said insulation along another portion of said path whereby the circuit is broken, said one end of said one element being in contact with said insulation when said rotors are angularly matched thereby breaking the circuit, means responsive to a first train of signals for indexing one of said rotor step-by-step through a number of steps correlated with the number of signals in the train whereby said rotors are angularly mis-matched and said one end of said one element breaks contact with said insulation and makes contact with said strip to complete the circuit, and means responsive to a second train of signals for indexing said other rotor step-by-step in the same direction as said one rotor, whereby said one end of said one element again contacts said insulation to rebreak the circuit.

12. A device as defined in claim 11 in which said two indexing means comprise first and second solenoids energizable by the first and second train of signals, respectively.

13. A device as defined in claim 11 further including a shaft rotatably mounting one of said rotors, and a sleeve coaxially surrounding said shaft and rotatably mounting the other of said rotors.

14. A device as defined in claim 13 in which said indexing means further include ratchet wheels coaxially fixed to said shaft and sleeve respectively and operably connected to said solenoids.

15. In a mechanism for conditioning an electrical circuit in response to a first train of signals and for changing the condition of the circuit in response to a second train of signals, the combination of, a base, a current conducting band on said base and defining an arcuate path for the flow of current, a first rotor spaced from said conducting band and having insulator means and a conductor strip facing said conducting band, said conductor strip defining an arcuate current path which is substantially concentric with the path defined by said conducting band and which has its ends separated by said insulator means, a second rotor sandwiched between said first rotor and said conducting band and carrying a conductor element movable along a predetermined arcuate path with opposite ends thereof sweeping across said conducting band and said conductor strip thereby to complete an electrical circuit through said band, said element, and said strip, one of said ends sweeping across said insulator means as said conductor element moves along a portion of said predetermined path thereby to break said circuit, said rotors being rotatable about an axis coaxial with said paths, said one end being in contact with one of said conductor strip and said insulator means when said rotors are angularly matched whereby said circuit is in one condition, means responsive to a first train of signals for advancing one of said rotors through an angular distance correlated with the number of signals in the train whereby said rotors are angularly mis-matched and said one end contacts the other of said conductor strip and said insulator means to place said circuit in another condition, and means responsive to a second train of signals for advancing the other of said rotors in the same direction as said one rotor, whereby said one end resumes contact with the initial one of said conductor strip and said insulator means to return said circuit to said one condition.

16. A mechanism as defined in claim 15 in which said conducting band is a circular band of conductive material and is coaxial with the axis of rotation of said rotors.

17. A mechanism as defined in claim 16 in which said conductor strip is an arcuately curved strip of conductive material and is concentric with said conducting band.

18. A mechanism as defined in claim 17 in which said conductor element comprises a brush having one end projecting from one side of said second rotor and spaced radially from said axis in accordance with the radius of said conductor strip, and having an opposite end projecting from the opposite side of said second rotor and spaced radially from said axis in accordance with the radius of said conducting band.

References Cited

UNITED STATES PATENTS

| | | | |
|---|---|---|---|
| 2,408,543 | 10/1946 | Arnot | 318—31 |
| 2,682,629 | 6/1954 | Jordan et al. | 318—31 |
| 3,117,266 | 1/1964 | Raymond | 318—31 X |

ARIS L. RADER, *Primary Examiner.*

T. E. LYNCH, *Assistant Examiner.*

U.S. Cl. X.R.

318—467, 33